US008532803B2

(12) United States Patent
Oh et al.

(10) Patent No.: US 8,532,803 B2
(45) Date of Patent: Sep. 10, 2013

(54) APPARATUS FOR PROCESSING AN AUDIO SIGNAL AND METHOD THEREOF

(75) Inventors: Hyen-O Oh, Seoul (KR); Jong Ha Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 806 days.

(21) Appl. No.: 12/719,254

(22) Filed: Mar. 8, 2010

(65) Prior Publication Data

US 2010/0228368 A1 Sep. 9, 2010

Related U.S. Application Data

(60) Provisional application No. 61/157,907, filed on Mar. 6, 2009.

(51) Int. Cl.
*G06F 17/00* (2006.01)

(52) U.S. Cl.
USPC ............................................................ 700/94

(58) Field of Classification Search
USPC .................. 700/94; 381/56–59, 98–104, 119
See application file for complete search history.

(56) References Cited

U.S. PATENT DOCUMENTS

| | | | | |
|---|---|---|---|---|
| 5,016,104 | A * | 5/1991 | Lim | 348/613 |
| 5,633,938 | A * | 5/1997 | Porter, III | 381/98 |
| 5,668,885 | A * | 9/1997 | Oda | 381/98 |
| 5,859,826 | A * | 1/1999 | Ueno et al. | 369/47.2 |
| 6,728,382 | B1 * | 4/2004 | Silfvast | 381/119 |
| 6,798,889 | B1 * | 9/2004 | Dicker et al. | 381/303 |
| 7,317,800 | B1 * | 1/2008 | Vierthaler et al. | 381/61 |
| 2005/0185802 | A1 * | 8/2005 | Yoshida | 381/98 |
| 2005/0276425 | A1 * | 12/2005 | Forrester et al. | 381/104 |
| 2006/0149538 | A1 | 7/2006 | Lee et al. | |
| 2006/0182171 | A1 * | 8/2006 | Kuijk et al. | 375/229 |
| 2006/0206316 | A1 | 9/2006 | Sung et al. | |
| 2008/0133223 | A1 | 6/2008 | Son et al. | |

FOREIGN PATENT DOCUMENTS

JP 9-90989 A 4/1997

* cited by examiner

*Primary Examiner* — Vivian Chin
*Assistant Examiner* — Leonard M Giannone
(74) *Attorney, Agent, or Firm* — Birch, Stewart, Kolasch & Birch, LLP

(57) ABSTRACT

A method of processing an audio signal is disclosed. The present invention includes receiving, by an audio processing apparatus, an input signal; extracting a low frequency signal, a mid frequency signal and a high frequency signal from the input signal; obtaining at least one of a low-band gain and a harmonic control factor, based on a loudspeaker characteristic; obtaining mid-band gain based on the loudspeaker characteristic; generating a modified low frequency signal by applying the low-band gain to the low frequency signal; when the harmonic control factor is obtained, generating a harmonic signal from the modified low frequency signal using the harmonic control factor, generating a modified mid frequency signal by applying the mid-band gain to the mid frequency signal; and, generating a mixed signal by mixing the modified mid frequency signal, the high frequency signal, and at least one of the modified low frequency signal and the harmonic signal.

16 Claims, 18 Drawing Sheets

200

(A)

(B)

APPARATUS FOR PROCESSING AN AUDIO SIGNAL AND METHOD THEREOF

CROSS-REFERENCE TO RELATED APPLICATION

This application claims the benefit of U.S. Provisional Application No. 61/157,907 filed on Mar. 6, 2009 which is hereby incorporated by reference.

BACKGROUND OF THE INVENTION

1. Field of the Invention

The present invention relates to an apparatus for processing an audio signal and method thereof. Although the present invention is suitable for a wide scope of applications, it is particularly suitable for processing an audio signal.

2. Discussion of the Related Art

Generally, an audio signal is outputted via a loud speaker provided to a television set, a portable device or the like or a headset and the like. Before the audio signal is outputted via a speaker or the like, an audio processor can perform such processing as noise canceling, normalizing, volume adjusting and the like on the audio signal.

However, according to a related art, in performing the bass control, if a frequency response of a loud speaker is low for a low frequency or bass is excessively boosted, it may cause a problem that a signal is distorted.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which bass can be enhanced in consideration of properties (e.g., frequency response, etc.) of a loudspeaker.

Another object of the present invention is to provide an apparatus for processing an audio signal and method thereof, by which a bass control by a linear gain and a bass control by a harmonic signal can be performed in parallel in accordance with a size of a signal.

Another object of the present invention is to provide an apparatus for processing an audio signal and method thereof, by which a bass control by a harmonic signal is supplementarily performed on a portion having limitation put on a bass control by a linear gain.

A further object of the present invention is to provide an apparatus for processing an audio signal and method thereof, by which a bass control by a linear gain and a bass control by a harmonic signal can be simultaneously performed through over-boost and saturation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for processing an audio signal, comprising: receiving, by an audio processing apparatus, an input signal; extracting a low frequency signal, a mid frequency signal and a high frequency signal from the input signal; obtaining at least one of a low-band gain and a harmonic control factor, based on a loudspeaker characteristic; obtaining mid-band gain based on the loudspeaker characteristic; generating a modified low frequency signal by applying the low-band gain to the low frequency signal; when the harmonic control factor is obtained, generating a harmonic signal from the modified low frequency signal using the harmonic control factor, generating a modified mid frequency signal by applying the mid-band gain to the mid frequency signal; and, generating a mixed signal by mixing the modified mid frequency signal, the high frequency signal, and at least one of the modified low frequency signal and the harmonic signal is provided.

According to the present invention, the loudspeaker characteristic includes a frequency response for each frequency in a specific loudspeaker.

According to the present invention, the method further comprises reproducing an output signal by amplifying the mixed signal with a target level, the low-band gain is obtained further based on at least one of a characteristic of the output signal, a characteristic of the mixed signal and room properties.

According to the present invention, the harmonic control factor is obtained, when the low-band gain is equal to or greater than a threshold value.

According to the present invention, the low-band gain is negative-related to the harmonic control factor.

According to the present invention, the method comprises receiving a bass control command selecting whether to boost the low frequency signal, from a user-interface, the low-band gain, the mid-band gain and the harmonic control factor are obtained according to the bass control command.

According to the present invention, the low frequency signal, the mid frequency signal and the high frequency signal are extracted based on the loudspeaker characteristic.

To further achieve these and other advantages and in accordance with the purpose of the present invention, an apparatus for processing an audio signal, comprising: a receiving part receiving an input signal; a frequency signal extracting part extracting a low frequency signal, a mid frequency signal and a high frequency signal from the input signal; a gain controlling part obtaining at least one of a low-band gain and a harmonic control factor, based on a loudspeaker characteristic, and obtaining mid-band gain based on the loudspeaker characteristic; a first applying part generating a modified low frequency signal by applying the low-band gain to the low frequency signal; a harmonic extracting part, when the harmonic control factor is obtained, generating a harmonic signal from the modified low frequency signal, a second applying part generating a modified mid frequency signal by applying the mid-band gain to the mid frequency signal; and, a mixing part generating a mixed signal by mixing the modified mid frequency signal, the high frequency signal, and at least one of the modified low frequency signal and the harmonic signal is provided.

According to the present invention, the loudspeaker characteristic includes a frequency response for each frequency in a specific loudspeaker.

According to the present invention, the apparatus further comprises an amplifying/outputting part reproducing an output signal by amplifying the mixed signal with a target level, the low-band gain is obtained further based on at least one of a characteristic of the output signal, a characteristic of the mixed signal and room properties.

According to the present invention, the harmonic control factor is obtained, when the low-band gain is equal to or greater than a threshold value.

According to the present invention, the low-band gain is negative-related to the harmonic control factor.

According to the present invention, the apparatus further comprises a user-interface receiving a bass control command selecting whether to boost the low frequency signal, the low-band gain, the mid-band gain and the harmonic control factor are obtained according to the bass control command.

According to the present invention, the low frequency signal, the mid frequency signal and the high frequency signal are extracted based on the loudspeaker characteristic.

To further achieve these and other advantages and in accordance with the purpose of the present invention, a computer-readable medium having instructions stored thereon, which, when executed by a processor, causes the processor to perform operations, comprising: receiving, by an audio processing apparatus, an input signal; extracting a low frequency signal, a mid frequency signal and a high frequency signal from the input signal; obtaining at least one of a low-band gain and a harmonic control factor, based on a loudspeaker characteristic; obtaining mid-band gain based on the loudspeaker characteristic; generating a modified low frequency signal by applying the low-band gain to the low frequency signal; when the harmonic control factor is obtained, generating a harmonic signal from the modified low frequency signal, generating a modified mid frequency signal by applying the mid-band gain to the mid frequency signal; and, generating a mixed signal by mixing the modified mid frequency signal, the high frequency signal, and at least one of the modified low frequency signal and the harmonic signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

According to the present invention, terminologies not disclosed in this specification can be construed as the following meanings and concepts matching the technical idea of the present invention. Specifically, 'coding' can be interpreted as 'encoding' or 'decoding' occasionally. And, 'information' in this disclosure is the terminology that generally includes values, parameters, coefficients, elements and the like and its meaning can be construed as different occasionally, by which the present invention is non-limited.

In this disclosure, an audio signal indicates a signal identifiable via an auditory sense to be discriminated from a video signal in a broad sense. In a narrow sense, the audio signal is a signal having no speech property or a less speech property to be discriminated from a speech signal. According to the present invention, an audio signal needs to be interpreted in a broad sense but can be understandable as a narrow-sense audio signal in case of being discriminated from a speech signal.

Figure 1:
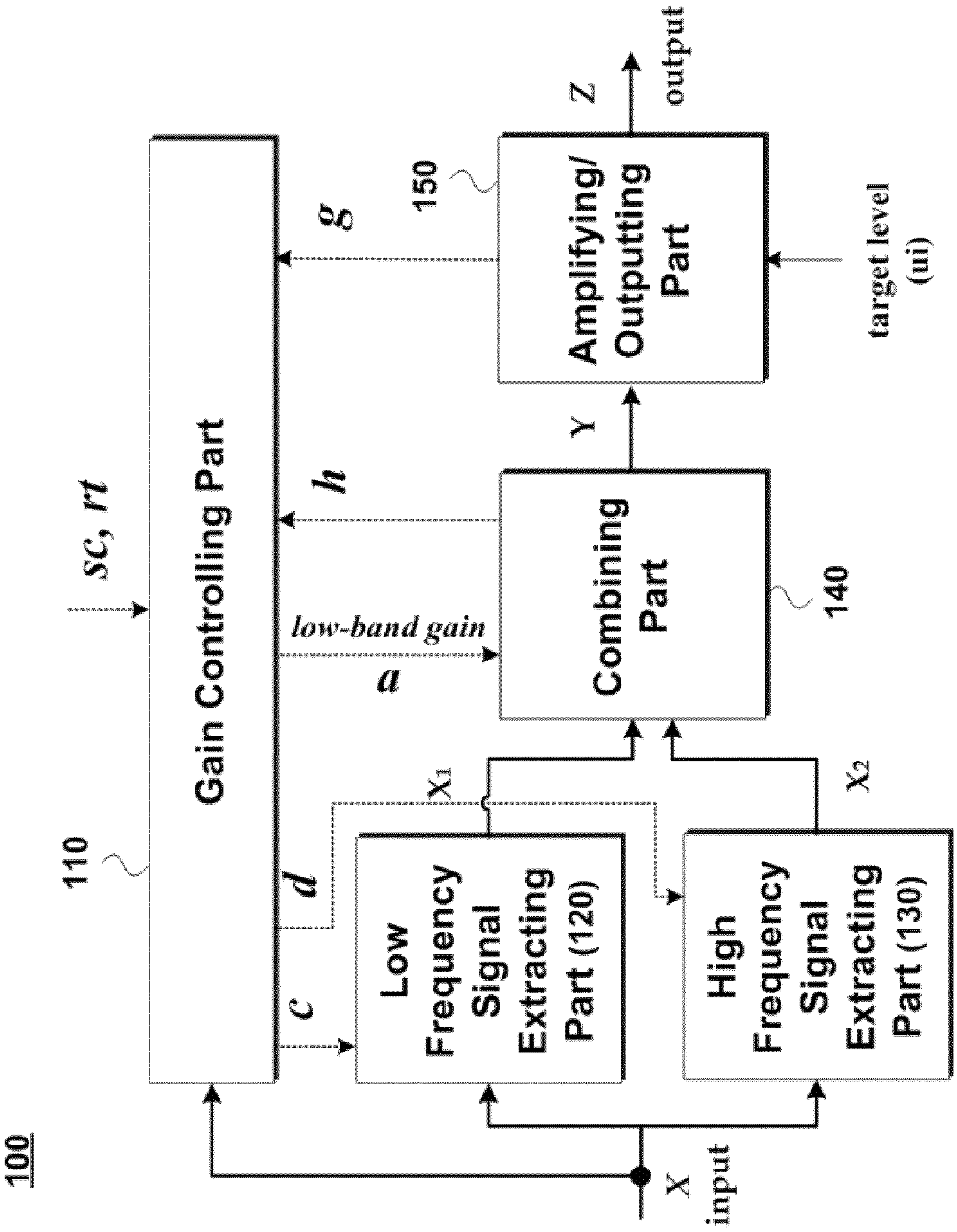
FIG. 1 is a block diagram of an audio signal processing apparatus according to a first embodiment of the present invention.
Figure 2:
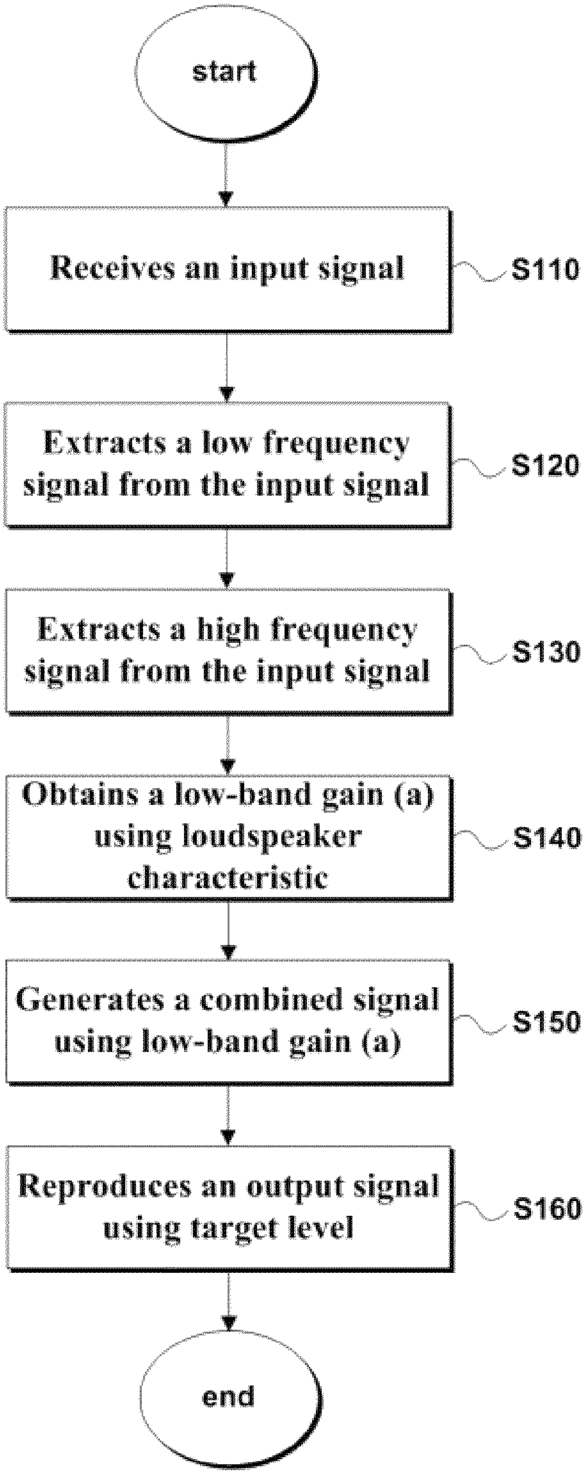
FIG. 2 is a flowchart for a method of processing an audio signal according to a first embodiment of the present invention.

FIG. 1 is a block diagram for configuration of an audio signal processing apparatus according to a first embodiment of the present invention. And, FIG. 2 is a flowchart for a method of processing an audio signal according to a first embodiment of the present invention.

Referring to FIG. 1, an audio signal processing apparatus 100 according to a first embodiment of the present invention includes a gain controlling part 110, a low frequency signal extracting part 120, a high frequency signal extracting part 130 and a combining part 140 and is able to further include an amplifying/outputting part 150. The first embodiment of the present invention is explained with reference to FIG. 1 and FIG. 2 as follows.

First of all, the gain controlling part 110 receives signal property information h on properties of a combined signal Y from the combining part 140 and also receives output property information g on properties of an output signal Z from the amplifying/outputting part 150. The signal property information h and the output property information g shall be explained in detail later.

The gain controlling part 110 delivers cutoff frequency information c of a low frequency and cutoff frequency information d of a high frequency to the low frequency signal extracting part 120 and the high frequency signal extracting part 130, respectively. In a filer device, a value over (or below) a reference frequency in an input signal attenuates below a determined gain. In this case, the cutoff frequency corresponds to the reference frequency. In a low-pass filer (LPF), a signal over a cutoff frequency $f_c$ attenuates below a predetermined gain. In this case, the cutoff frequency is named a cutoff frequency c of the low frequency. On the contrary, in a high-pass filter (HPF), a signal having a frequency over the cutoff frequency fc is allowed to pass but others are attenuated. In this case, the cutoff frequency of the high-pass filter shall be named a cutoff frequency d. The cutoff frequency c of the low frequency may be equal to the cutoff frequency d of the high frequency in the present invention, by which the present invention is non-limited.

Meanwhile, the cutoff frequency information c of the low frequency (and the cutoff frequency information d of the high frequency) can be generated based on acoustic properties (e.g., properties of a loudspeaker (sc) of a transducer, which are the properties for a specific speaker or the like, and acoustic properties (or room properties (rt)) of a reproduction space, which are properties for a specific reproduction space. In this case, the properties (sc) of the loudspeaker can include a frequency response per frequency. In particular, as mentioned in the foregoing description, since the loudspeaker properties (Sc) and the room properties (rt) are independent from an input signal, the cutoff frequency can be set to a fixed value.

Moreover, since the cutoff frequency c or d is a factor for determining a tone of bass, it can be adaptively generated based on the properties of the input signal X and the output property information g on an output signal as well as the loudspeaker properties (sc) and the room properties (rt). In this case, the cutoff frequency c or d can be set to a time-variant value that varies according to a time.

The low frequency signal extracting part 220 extracts a low frequency signal $X_1$ from the input signal X based on the cutoff frequency information c received from the gain controlling part 210 [S120].

Likewise, the high frequency signal extracting part 230 extracts a high frequency signal $X_2$ from the input signal X based on the cutoff frequency information d received from the gain controlling part 210 [S130]. In this case, the high frequency signal can be generated from subtracting the low frequency signal from the input signal X, by which the present invention is non-limited.

Meanwhile, the gain controlling part 110 generates a low-band gain a applied to the low frequency signal [S140]. The low-band gain a is provided to boost or suppress (or attenuate) the low frequency signal. In order to boost bass, the low-band gain a is preferably set to a value equal to or greater than 1. On the contrary, in order to attenuate bass, the low-band gain a is preferably set to a value equal to or smaller than 1. Meanwhile, the low-band gain a can be generated based on at least one of the loudspeaker properties (sc), the room properties (rt), the output property information g and properties h of the combined signal Y. Moreover, the low-band gain a can be variably changed according to the properties of the input signal X.

The combining part 140 generates a combined signal Y using the low-band gain a, the low frequency signal $X_1$ and the high frequency signal $X_2$ [S150]. First of all, a modified low frequency signal $a\cdot X_1$ is generated from applying the low-band gain a to the low frequency signal $X_1$. And, the combined signal Y is then generated by adding the high frequency signal $X_2$ to the modified low frequency signal $a\cdot X_1$. In particular, the combined signal Y can be generated by the following formula.

$$Y=a\cdot X_1+a_2\cdot X_2 \qquad \text{[Formula 1]}$$

In Formula 1, the Y indicates a combined signal, the a indicates a low-band gain, the $X_1$ indicates a low frequency signal, the $a_2$ indicates a high-band gain, and the $X_2$ indicates a low frequency signal.

In this case, the high-band gain $a_2$ is set to a constant as a fixed value or can be set to a value calculated by the gain controlling part 110 like the low-band gain a.

Figure 3:
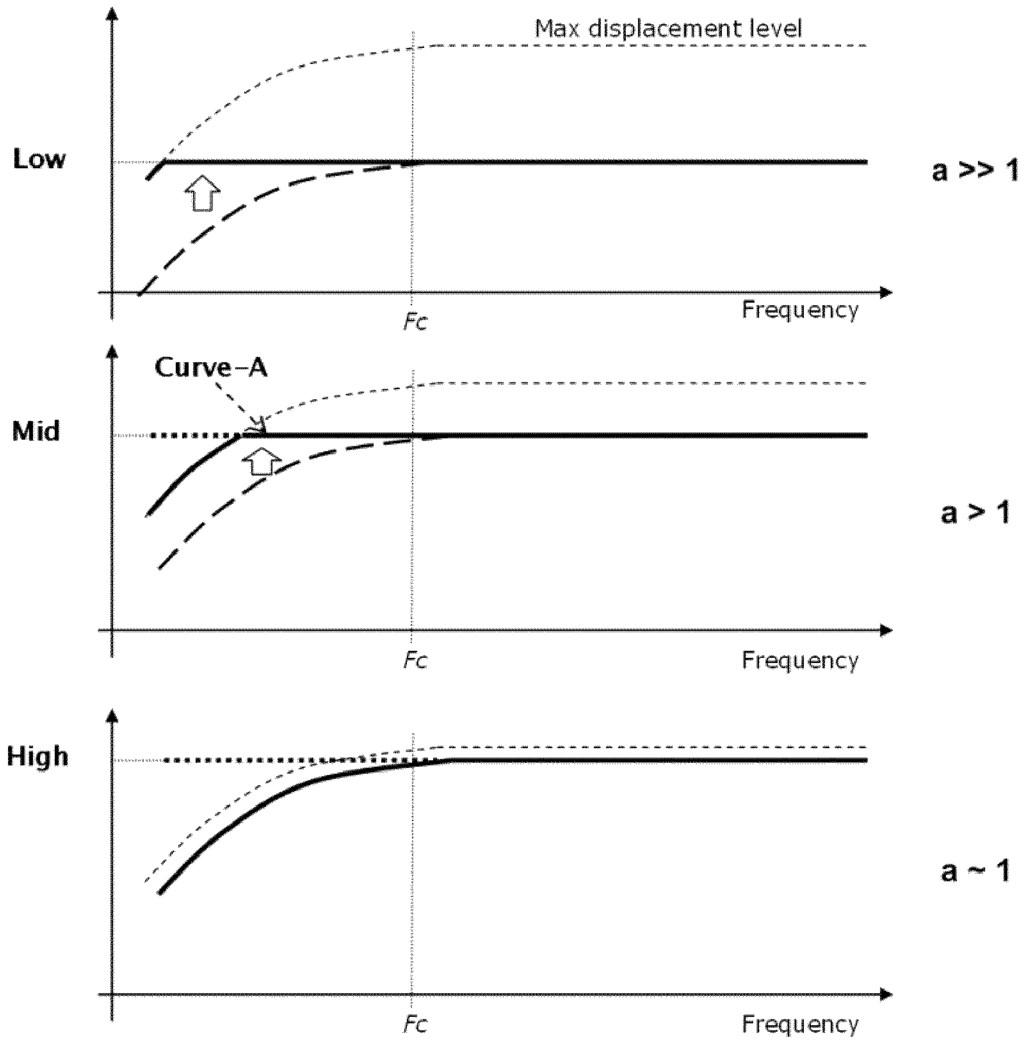
FIG. 3 is a graph for a frequency response per signal size according to a first embodiment of the present invention.

Thus, by applying the low-band gain a, the frequency response of the low frequency band can be enhanced, especially when a size of a signal is small. FIG. 3 is a graph for a frequency response per signal size according to a first embodiment of the present invention. In FIG. 3, (A) shows a frequency response when a signal size is small. In FIG. 3, (B) shows a frequency response when a signal size is intermediate. In FIG. 3, (C) shows a frequency response when a signal size is big.

Referring to (A) of FIG. 3, it can be observed that a frequency response curve is represented as a long dotted line on a low frequency band below a cutoff frequency $F_c$. A maximum displacement level for the frequency response curve to move linearly is represented as a short dotted line. By applying a low-band gain a as a linear gain, a frequency response of a low frequency band can be enhanced as represented as a solid line. In this case, it can be said that the low-band gain a is relatively greater than 1.

Referring to (B) of FIG. 3, compared to (A), it can be observed that a maximum displacement level for the frequency response curve to move linearly is relatively low. Owing to a low-band gain a, which is a linear gain, a frequency response on a low frequency band can be enhanced to some extent. In this case, the low-band gain a is set to a value equal to or greater than 1

Referring to (C) of FIG. 3, when a size of a signal is large, it can be observed that a width for a frequency response curve to linearly move is very narrow. Hence, it is very limitative to enhance a frequency response of a low frequency band using a linear gain a. In this case, the low-band gain a is set to a value almost close to 1.

Meanwhile, in order to compensate a difference of delay generated between the low frequency signal extracting part 120 and the high frequency signal extracting part 130, the combining part 140 applies a delay of a predetermined sample length to either the low frequency signal $X_1$ or the high frequency signal $X_2$ and is then able to combine the two signals together. By compensating this delay, the two signals can be synchronized with each other.

In performing the processing process according to the high frequency signal extracting part 110, the frequency response properties of the loudspeaker can be differently applied according to an outputted sound pressure level (SPL).

The combining part 140 feeds back the signal property information h, which is the information on the properties of the combined signal Y, to the gain controlling part 110. In this case, the signal property information h can include a power of a signal, a peak of a signal, information indicating whether a peak value is greater than a property value, and the like.

The amplifying/outputting part 150 amplifies the combined signal Y based on a target level (ui) inputted by a user or the like and then reproduces a final output signal Z via such a device as a speaker and the like. In doing so, the final output signal Z is amplified according to the target level (ui) to vary a gain. The final output signal Z is outputted via the speaker so that the signal is modified or distorted according to the properties (sc) of the loudspeaker. Namely, in order to obtain the output property information g, which is the property of the final output signal Z, the amplifying/outputting part 150 can further include such an audio collecting device as a microphone and the like and a signal analyzer. Meanwhile, the output property information g can include frequency information of a signal, phase information of the signal, power or level information of the signal and the like. The output property information g is fed back to the gain controlling unit 110 and is then used to generate the cutoff frequency c or d, the low-band gain a and the like.

Figure 4:
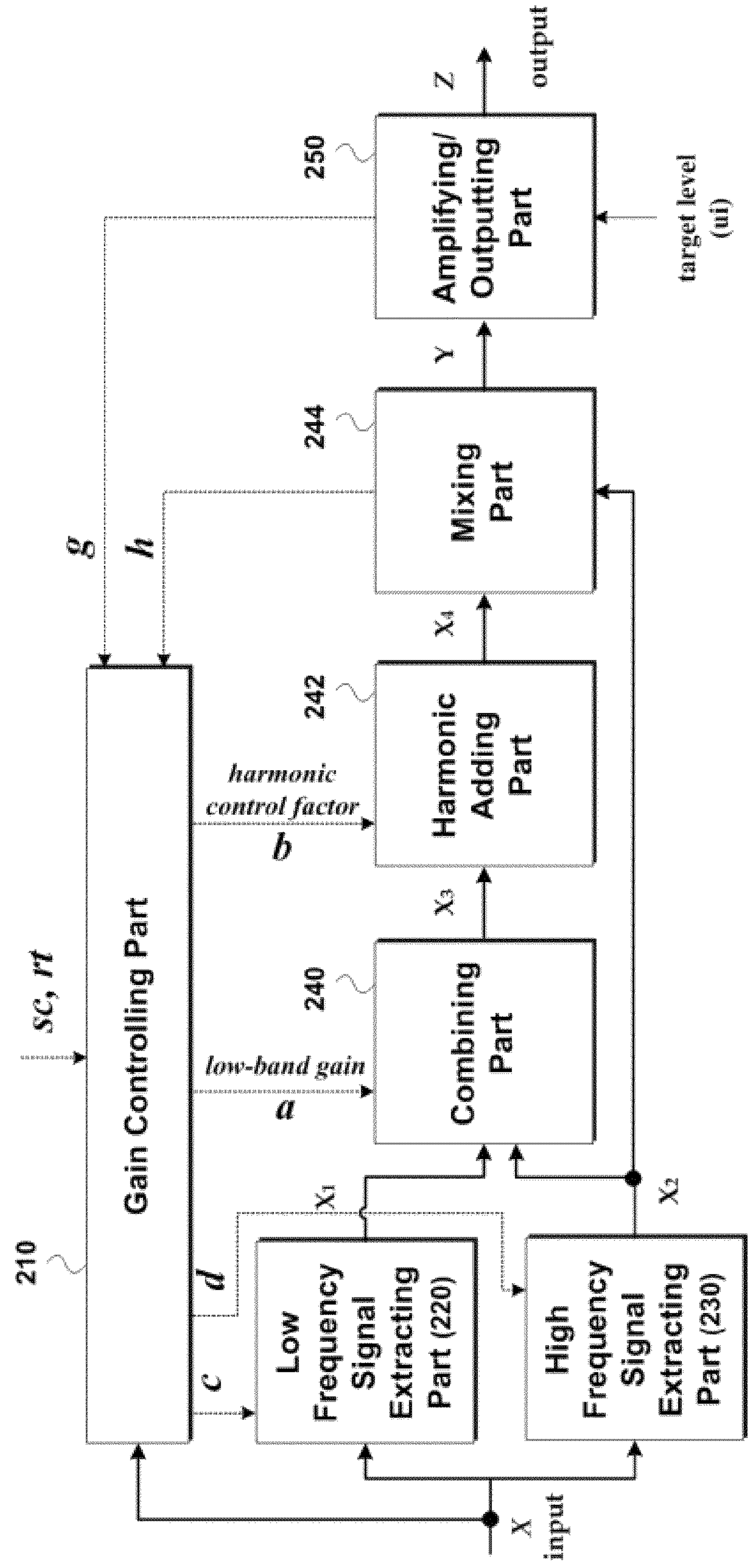
FIG. 4 is a block diagram of an audio signal processing apparatus according to a second embodiment of the present invention.
Figure 5:
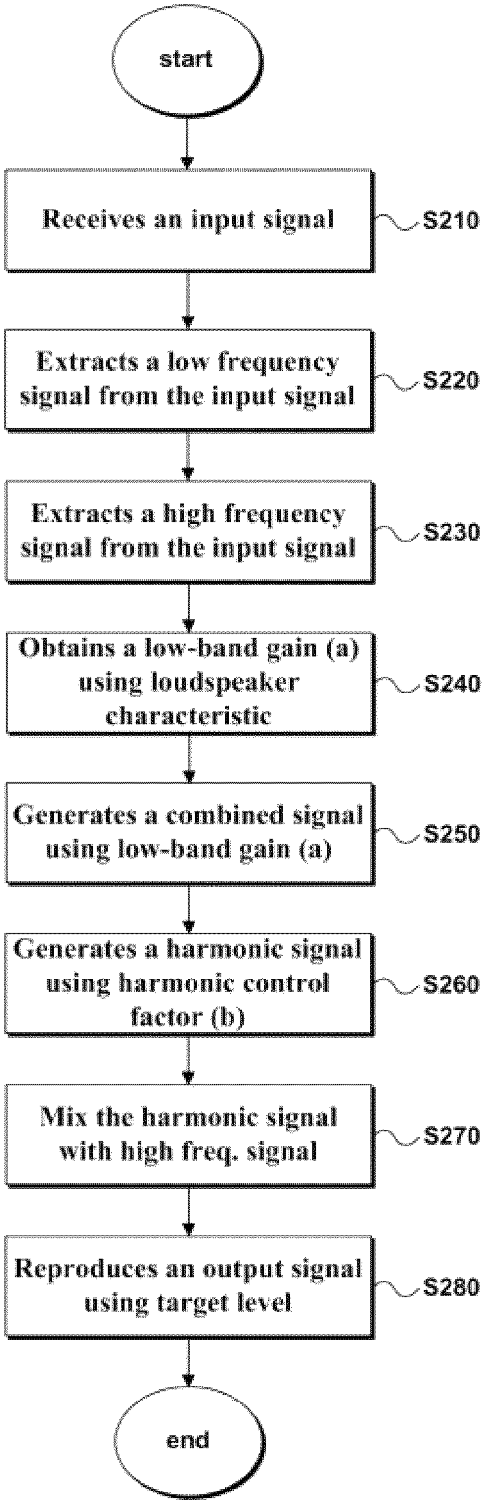
FIG. 5 is a flowchart for a method of processing an audio signal according to a second embodiment of the present invention.

FIG. 4 is a block diagram of an audio signal processing apparatus according to a second embodiment of the present invention. And, FIG. 5 is a flowchart for a method of processing an audio signal according to a second embodiment of the present invention. Although the first embodiment 100 controls a low frequency signal using a low-band gain a, an audio signal processing apparatus 200 according to a second embodiment of the present invention relates to an embodiment for controlling a low frequency signal using a low-band gain a and a harmonic control factor b.

Referring to FIG. 4, an audio signal processing apparatus 200 according to a second embodiment of the present invention includes a gain controlling part 210, a low frequency signal extracting part 220, a high frequency signal extracting part 230 and a combining part 240, like the first embodiment 100, and further includes a harmonic extracting part 242 and a mixing part 244. Besides, the audio signal processing apparatus 200 can further include an amplifying/outputting part 250.

Since the components having the same names of the former components included in the first embodiment 100 perform the almost same functions, details of these components are omitted from the following description. And, components configured to perform other functions are described as follows.

First of all, like the former gain controlling part 110 of the first embodiment 100, the gain controlling part 210 generates low frequency cutoff information c and high frequency cutoff information d and also generates a low-band gain a. Moreover, the gain controlling part 210 further generates a harmonic control factor b. In this case, the harmonic control factor b is the information for controlling a band and size of a harmonic signal generated by the harmonic adding part 242.

Meanwhile, a value of the harmonic control factor b can interoperate with a value of the low-band gain a. In particular, the harmonic control factor b is inverse proportional to the low-band gain a or can be negative-related to the low-band gain a. And, a sum of the harmonic control factor b and the low-band gain a can be almost set to a constant (or a fixed value). Since each of the low-band gain a and the harmonic control factor b is the factor for increasing a signal of a low frequency band or a bass signal, an extent for boosting the low frequency is already determined. Therefore, if the low-band gain a has a large value, the harmonic control factor b has a small value. If the low-band gain a has a small value, the harmonic control factor b can have a large value.

Meanwhile, since the low-band gain a is able to provide a linear gain using a reproduction limit of a loudspeaker or the like maximally, if an extent of the harmonic control factor b is raised rather than an extent of the low-band gain a, it is able to further reduce distortion of sound quality. Preferably, a value of the low-band gain a is maximally raised in a given environment (e.g., the given properties of the loudspeaker (sc)) and the value of the harmonic control factor b is determined for the rest. For this, optimal values of the low-band gain a and the harmonic control factor b are sought by fixing or adaptively changing the cutoff frequency c or d, by which the present invention is non-limited.

Meanwhile, using the low-band gain a and the harmonic control factor b, the combining part 240 turn off the boost of the low frequency signal or the harmonic extracting part 242 can turn off the generation of the harmonic signal. Namely, either the former or the latter is made operable.

Figure 6:
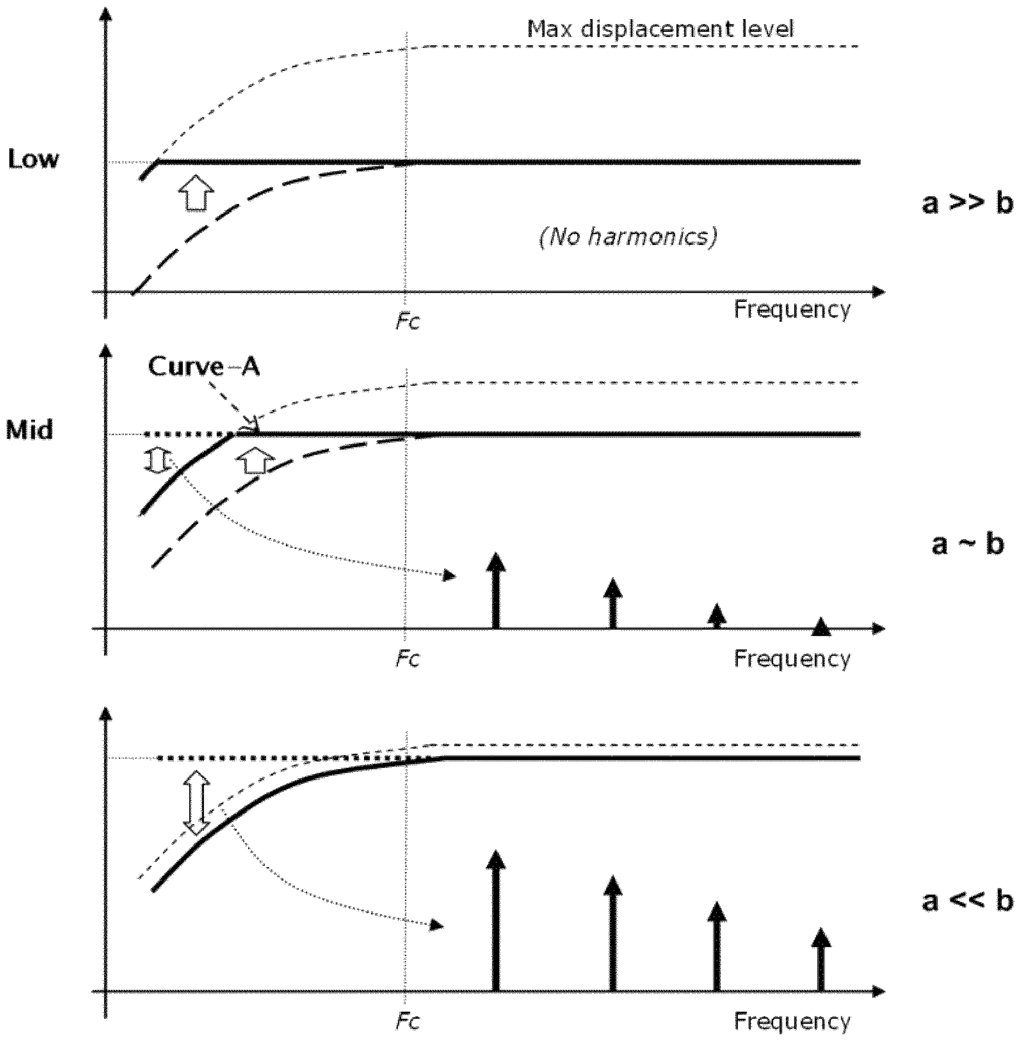
FIG. 6 is a graph for a frequency response per signal size according to a second embodiment of the present invention.

FIG. 6 is a graph for a frequency response per signal size according to a second embodiment of the present invention. In FIG. 6, (A) shows a frequency response when a signal size is small. In FIG. 6, (B) shows a frequency response when a signal size is intermediate. In FIG. 6, (C) shows a frequency response when a signal size is big.

Referring to (A) of FIG. 6, it can be observed that a frequency response curve is represented as a long dotted line on a low frequency band below a cutoff frequency $F_c$. A maximum displacement level for the frequency response curve to move is represented as a short dotted line. By applying a low-band gain a as a linear gain, a frequency response of a low frequency band can be enhanced as represented as a solid line.

Referring to (B) of FIG. 6, compared to (A), it can be observed that a maximum displacement level for the frequency response curve to move is relatively low. Owing to a low-band gain a, which is a linear gain, a frequency response on a low frequency band can be enhanced. Additionally, by the control of the harmonic control factor b, the frequency response can be further enhanced (cf. a considerably short doted line).

Referring to (C) of FIG. 6, when a size of a signal is large, it can be observed that a width for a frequency response curve to linearly move is very narrow. Hence, the frequency response can be enhanced by the harmonic control factor b rather than the linear gain (cf. a considerably short doted line).

Referring now to FIG. 4 and FIG. 5, as mentioned in the foregoing description, like the first embodiment, the receiving part (not shown in the drawing) receives an input signal [S210]. The low frequency signal extracting part 220 extracts a low frequency signal $X_1$ from the input signal X using a cutoff frequency c or d [S220]. And, the high frequency signal extracting part 230 extracts a high frequency signal X, from the input signal X [S230]. Moreover, the gain controlling part 210 generates the aforesaid low-band gain a [S240]. The combining part 240 generates a combined signal $X_3$ by the following formula or the like using the low-band gain a like the former combining part 140 of the first embodiment [S250].

$$X_3 = a \cdot X_1 + a_2 \cdot X_2 \qquad \text{[Formula 2]}$$

In Formula 2, the $X_3$ indicates a combined signal, the $a_2$ indicates a low-band gain, the $X_1$ indicates a low frequency signal, the $a_2$ indicates a high-band gain, and the $X_2$ indicates a high frequency signal.

The harmonic extracting part 242 generates a harmonic signal from the combined signal $X_3$ based on the aforesaid harmonic control factor b, and outputs a combined signal with the harmonic signal $X_4$ (or a harmonic-added combined signal $X_4$ [S260]. In this case, a non-linear processing can be performed to generate the harmonic signal. For this, a saturation logic, a rectifier and the like are usable for the non-linear processing, by which the present invention is non-limited.

Meanwhile, in generating the harmonic signal, it is able to consider a headroom for a corresponding frequency region of a final output transducer (e.g., a speaker).

The mixing part 244 generates a mixed signal or a processed signal Y by mixing the harmonic signal $X_4$ and the high frequency signal $X_2$ together [S270]. In this case, it is able to apply a delay to one of the two signals. This is performed to compensate the delay occurring in each path or to design a direction for minimizing a maximum amplitude per frequency of a final signal synthesized by adjusting the relation between the two signals.

The signal property information h, which is the information on the properties of the processed signal Y, can be fed back to the gain controlling part 210. In this case, the signal property information h can include a power of the processed signal Y, a peak of a signal, information indicating whether a peak value is greater than a property value, and the like.

The amplifying/outputting part 250 amplifies the processed signal Y according to a target level (ui) like the former amplifying/outputting part 150 of the first embodiment. Subsequently, the amplifying/outputting part 250 reproduces a final output signal Z by outputting the amplified signal via such a device as a speaker and the like [S280].

Figure 7:
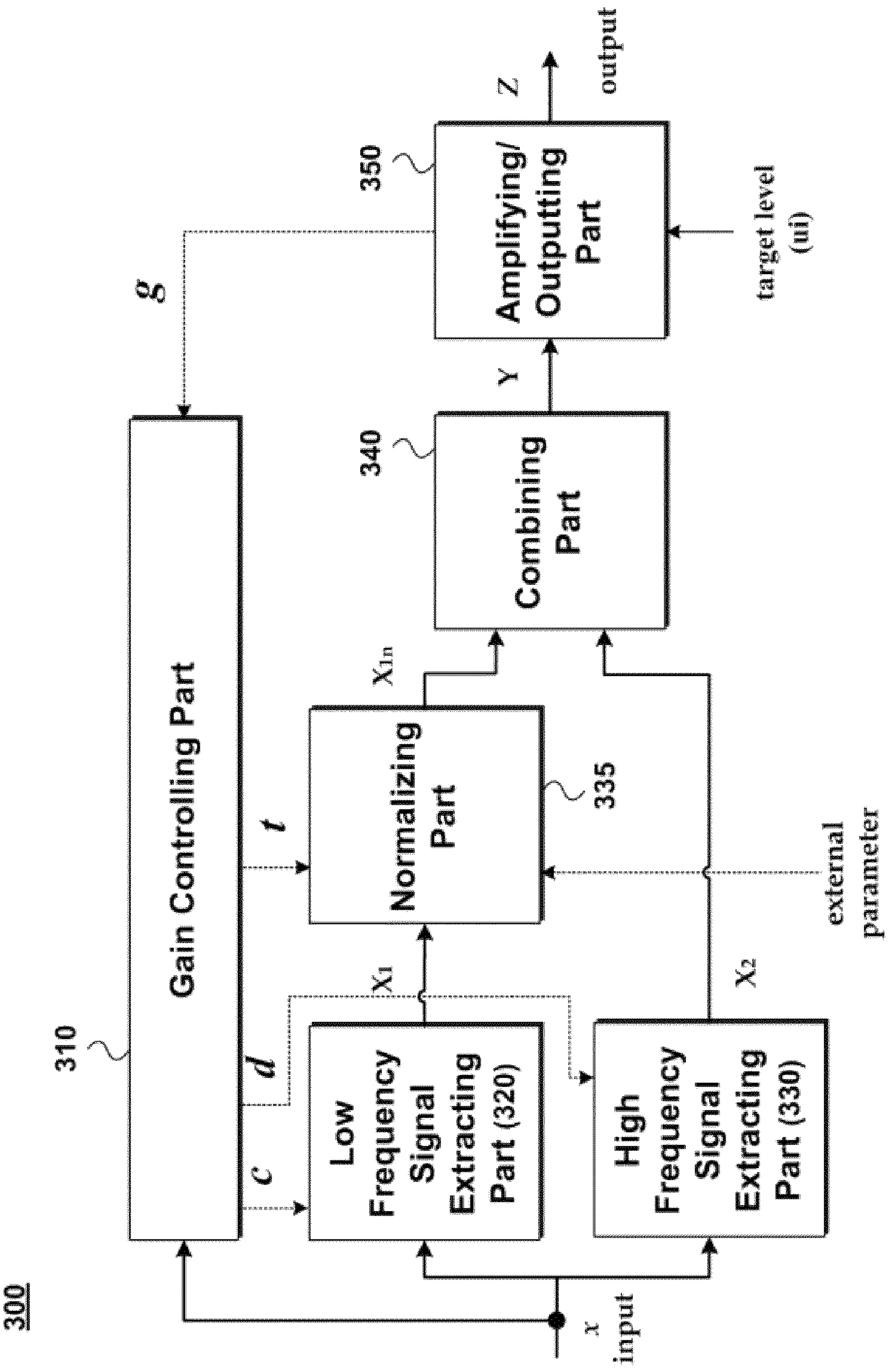
FIG. 7 is a block diagram of an audio signal processing apparatus according to a third embodiment of the present invention.
Figure 8:
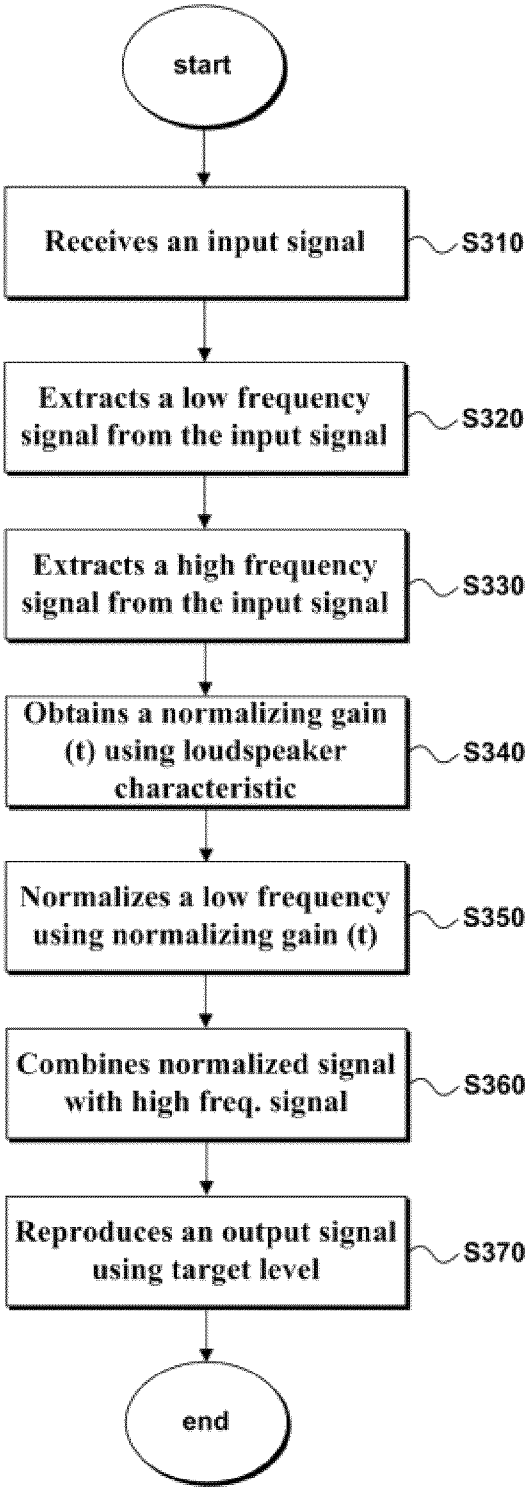
FIG. 8 is a flowchart for a method of processing an audio signal according to a third embodiment of the present invention.

FIG. 7 is a block diagram of an audio signal processing apparatus according to a third embodiment of the present invention, and FIG. 8 is a flowchart for a method of processing an audio signal according to a third embodiment of the present invention.

Referring to FIG. 7, an audio signal processing apparatus 300 according to a third embodiment of the present invention includes a gain controlling part 310, a low frequency signal extracting part 320, a high frequency signal extracting part 330, a normalizing part 335 and a combining part 340. Besides, the audio signal processing apparatus 300 can further include an amplifying/outputting part 350. In the following description, an audio signal processing apparatus and method according to a third embodiment of the present invention are explained with reference to FIG. 7 and FIG. 8.

First of all, the receiving part (not shown in the drawing) receives an input audio signal X [S310]. Like the first or second embodiment, the low frequency signal extracting part 320 extracts a low frequency signal $X_1$ from the input signal X using the cutoff frequency information c [S320]. Like the first or second embodiment, the high frequency signal extracting part 330 extracts a high frequency signal $X_2$ from the input signal X based on the cutoff frequency information d [S330].

Like the first or second embodiment, the gain controlling part 310 delivers the cutoff frequency information c and the cutoff frequency information d to the low frequency signal extracting part 320 and the high frequency signal extracting part 330, respectively. And, the gain controlling part 310 generates a normalizing gain t [S340]. In this case, the normalizing gain t can be generated in consideration of the aforesaid loudspeaker properties (sc) (e.g., frequency response) and a size of the input signal X. Namely, by determining the normalizing gain t, it is able to enhance bass within a maximum amplitude range of speaker without generation of distortion.

The normalizing part 335 generates a normalized low frequency signal $X_{1n}$ by performing normalization on the low frequency signal $X_1$ using the normalizing gain t determined by the gain controlling part 310 [S350]. And, the combining part 340 generates a combined signal Y by combining the normalized low frequency signal $X_{1n}$ and the high frequency signal $X_2$ together [S360].

Meanwhile, when the normalizing part 335 performs the normalization [S350], the normalization can be performed further using external parameters as well as the normalizing gain t. In particular, an extent of the bass enhancement can be controlled by the external parameters.

As mentioned in the above description, the combining part 340 generates the combined signal Y by combining the normalized low frequency signal $X_{1n}$ and the high frequency signal $X_2$ together [S360]. In doing so, the combined signal Y can be generated by the following formula.

$$Y=X_{1n}+X_2 \quad \text{[Formula 3]}$$

In Formula 3, the Y indicates a combined signal, the $X_{1n}$ indicates a normalized low frequency signal, and the $X_2$ indicates a high frequency signal.

In a manner similar to that of the first embodiment, the amplifying/outputting part 550 amplifies the combined signal Y according to a target level (ui) and then outputs the amplified signal via such a device as a speaker and the like [S370].

Thus, the audio signal processing apparatus and method according to the third embodiment of the present invention perform the normalizing on the low frequency signal by the above described components and operations, thereby enhancing the bass within the maximum amplitude range of the loudspeaker without distortion generation.

Figure 9:
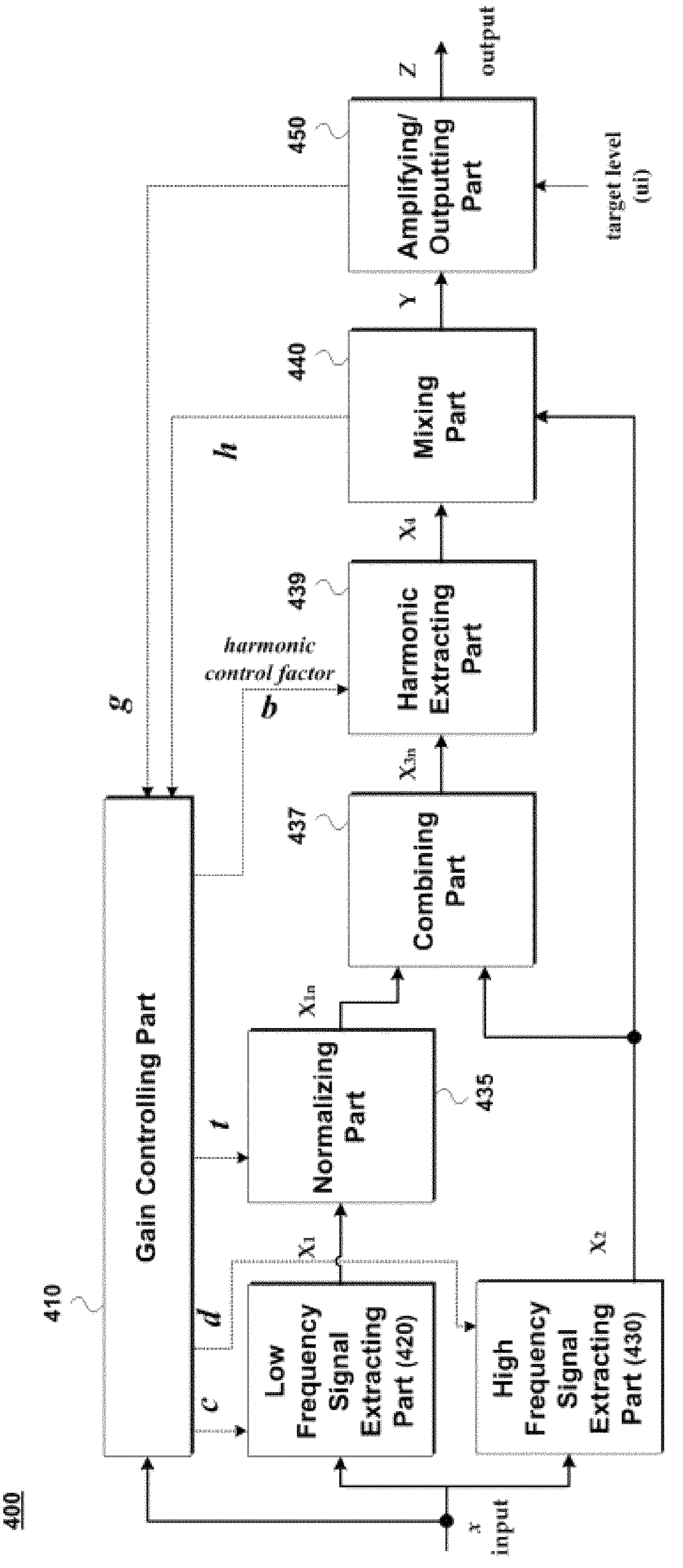
FIG. 9 is a block diagram of an audio signal processing apparatus according to a fourth embodiment of the present invention.
Figure 10:
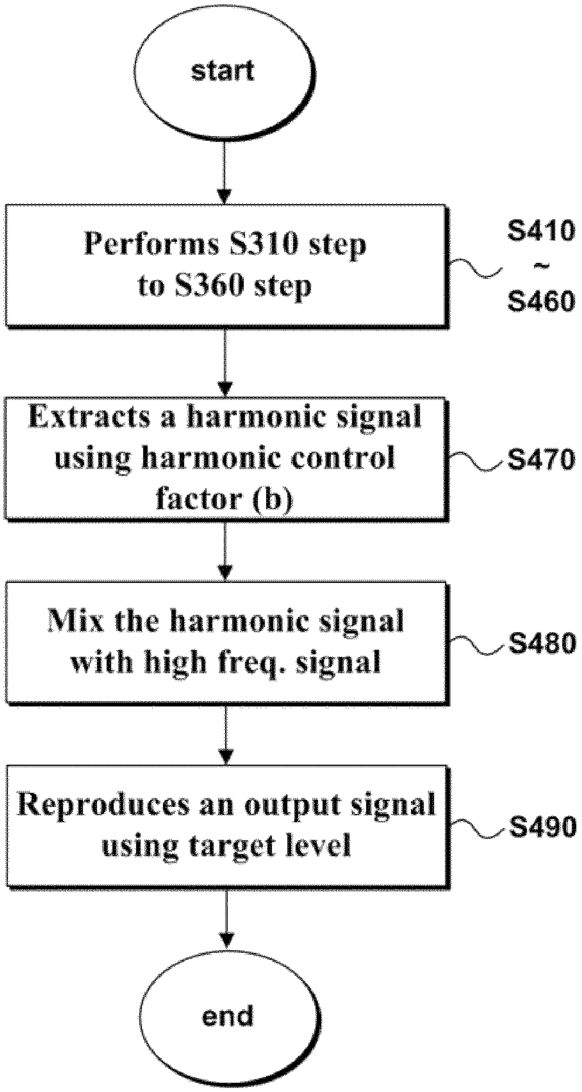
FIG. 10 is a flowchart for a method of processing an audio signal according to a fourth embodiment of the present invention.

FIG. 9 is a block diagram of an audio signal processing apparatus according to a fourth embodiment of the present invention, and FIG. 10 is a flowchart for a method of processing an audio signal according to a fourth embodiment of the present invention. Particularly, an audio signal processing apparatus according to a fourth embodiment of the present invention can correspond to a configuration in which the normalizing part 335 of the third embodiment 300 and the harmonic extracting part 242 of the second embodiment 200 are combined with each other.

Referring to FIG. 9 and FIG. 10, like the third embodiment, an audio signal processing apparatus 400 according to a fourth embodiment of the present invention includes a gain controlling part 410, a low frequency signal extracting part 420, a high frequency signal extracting part 430, a normalizing part 435 and a combining part 437 and is able to further include an amplifying/outputting part 450. The fourth embodiment 400 further includes a harmonic extracting part 439 and a mixing part 440.

The low frequency signal extracting part 420, the high frequency signal extracting part 430, the normalizing part 435 and the combining part 437, which also exist in the third embodiment 300, perform the steps S310 to S360 of the third embodiment 300 [S410 to S460]. Yet, a result of the combining part 437 is named a combined signal $X_{3n}$ instead of the combined signal Y according to the following formula.

$$X_{3n}=X_{1n}+X_2 \quad \text{[Formula 4]}$$

In Formula 4, the $X_{3n}$ indicates a combined signal, the $X_{1n}$ indicates a normalized low frequency signal, and the $X_2$ indicates a high frequency signal.

The harmonic extracting part 439 extracts a harmonic from the combined signal $X_{3n}$ based on a harmonic control factor b [S470]. In particular, the harmonic extraction can be performed by the same description of the step S260 of the second embodiment.

The mixing part 440 generates a mixed or processed signal Y by mixing the harmonic signal $X_4$ and the high frequency signal $X_2$ together. In particular, the step S270 is identically applicable to the step S480.

And, the amplifying/outputting part 450 amplifies the processed signal Y according to a target level (ui) and then outputs the amplified signal via such a device as a speaker and the like [S490].

Thus, the fourth embodiment can boost the bass using the harmonic signal after the normalization.

Figure 11:
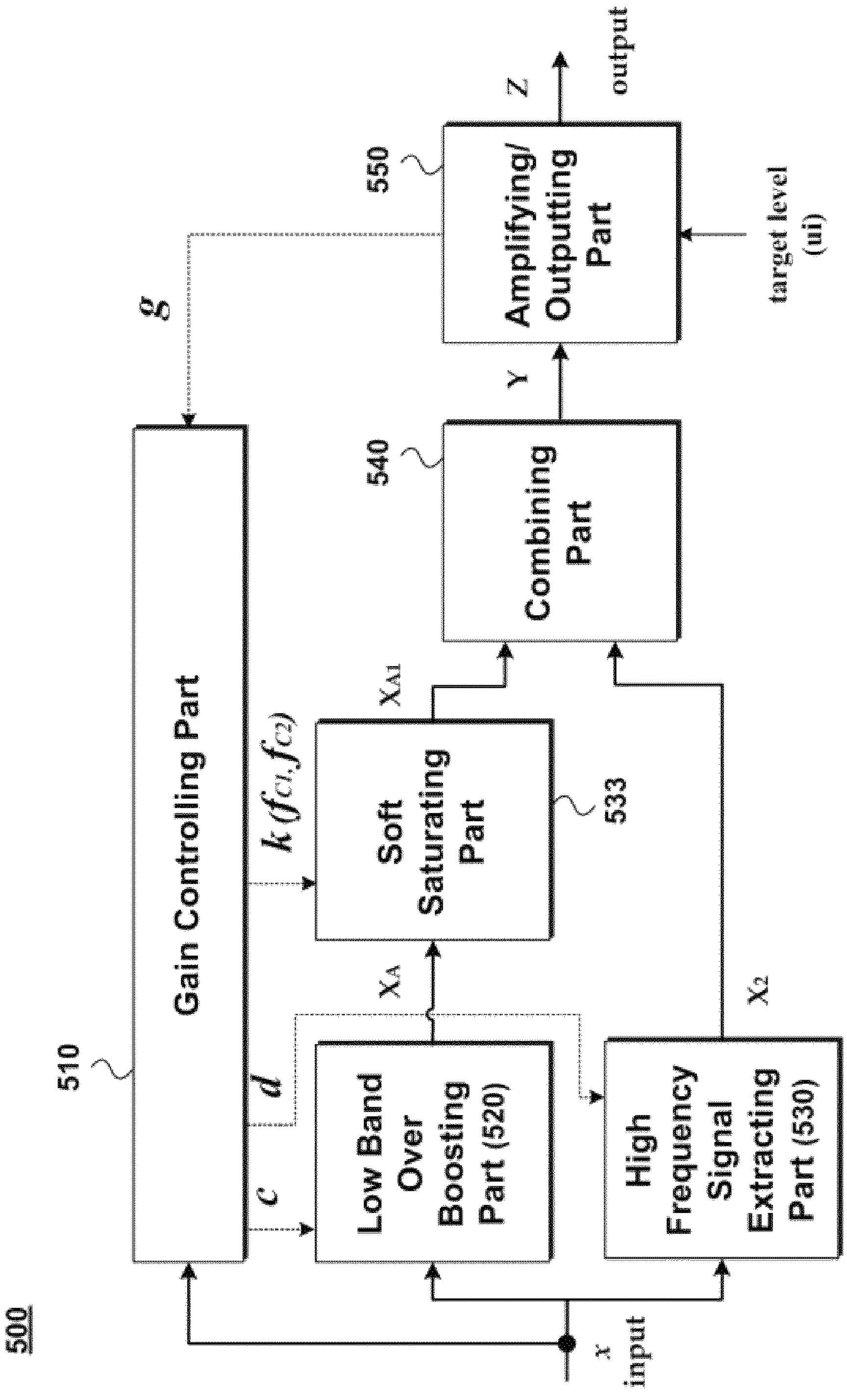
FIG. 11 is a block diagram of an audio signal processing apparatus according to a fifth embodiment of the present invention.
Figure 12:
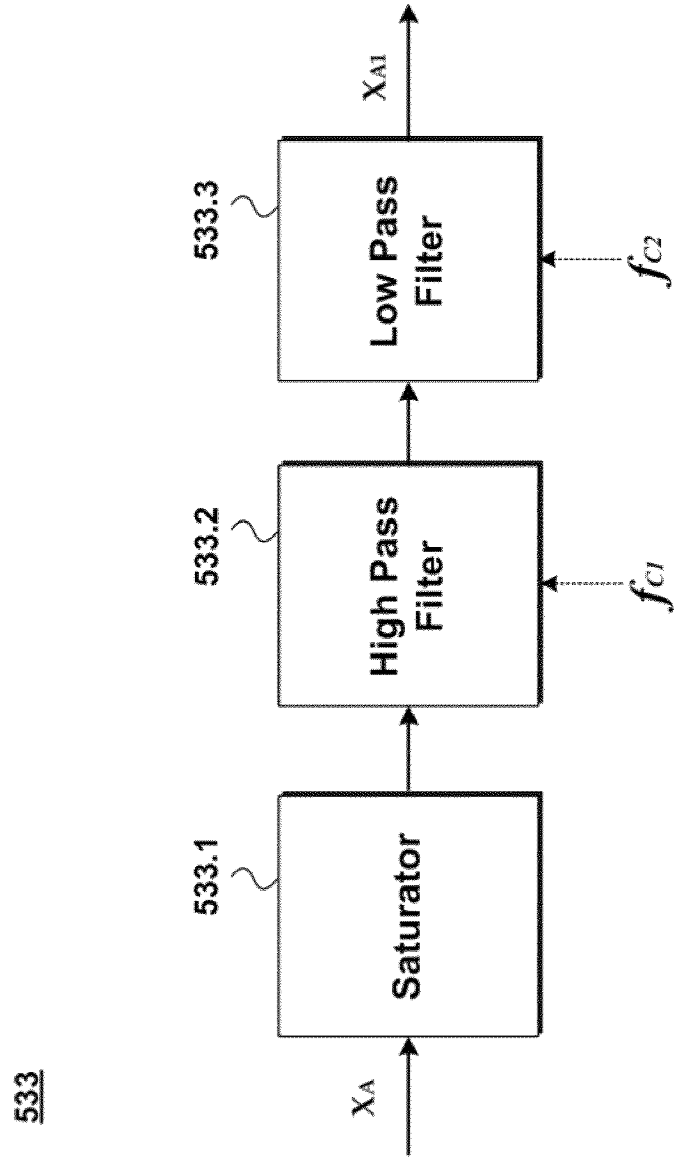
FIG. 12 is a detailed block diagram of an embodiment of a soft saturating part 533 according to a fifth embodiment of the present invention.
Figure 13:
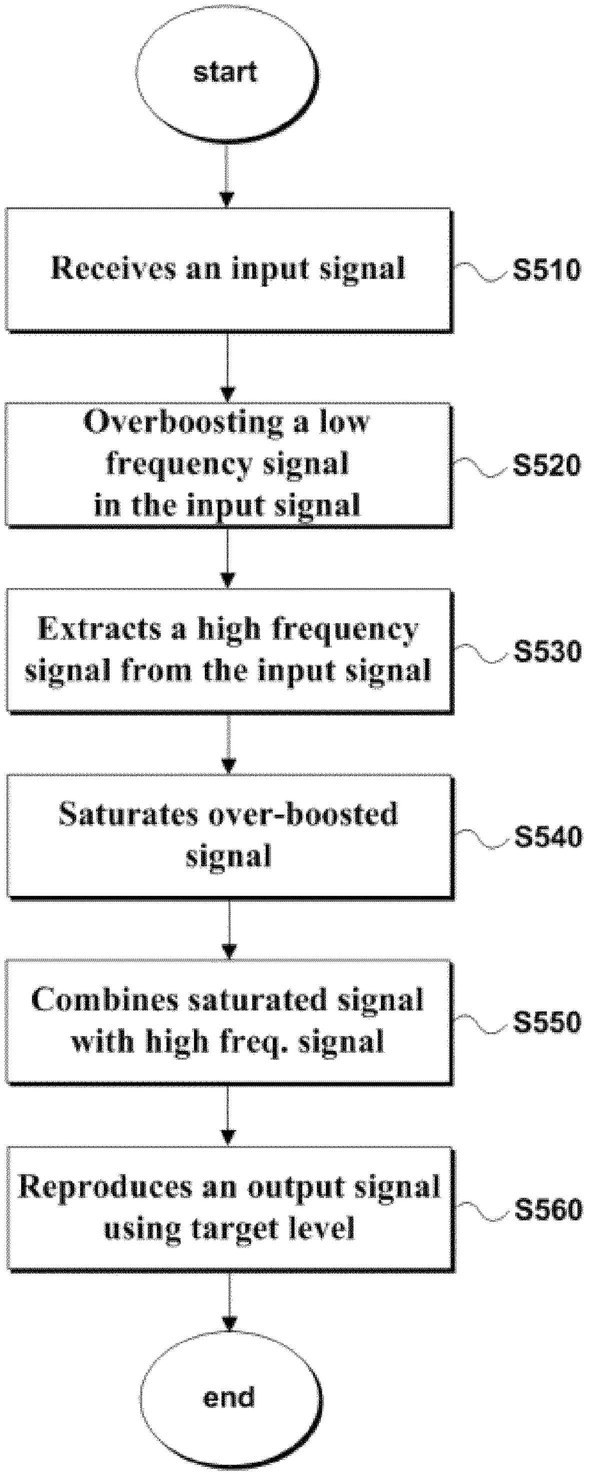
FIG. 13 is a flowchart for a method of processing an audio signal according to a fifth embodiment of the present invention.

FIG. 11 is a block diagram of an audio signal processing apparatus according to a fifth embodiment of the present invention, FIG. 12 is a detailed block diagram of an embodiment of a soft saturating part 533 according to a fifth embodiment of the present invention, and FIG. 13 is a flowchart for a method of processing an audio signal according to a fifth embodiment of the present invention.

Referring to FIG. 11, an audio signal processing apparatus 500 according to a fifth embodiment of the present invention includes a gain controlling part 510, a low band over-boosting part 520, a high frequency signal extracting part 530, a soft saturation part 533 and a combining part 540. Besides, the audio signal processing apparatus 500 can further include an amplifying/outputting part 450. The components having the same names of the former components included in the first embodiment 100 of the present invention can perform the same functions of the corresponding former components and their details are omitted from the following description.

Referring to FIG. 11 and FIG. 13, a receiving part (not shown in the drawings) receive an input signal [S510]. The low band over-boosting part 520 generates an over-boosted signal $X_A$ by over-boosting a low frequency signal in the input signal X based on cutoff frequency information c [S520]. In this case, the over-boosted signal $X_A$ is the signal including a full-band signal as well as the low frequency signal and means that the low frequency signal in the full-band signal is over-boosted.

The high frequency signal extracting part 530 extracts a high frequency signal $X_2$ from the input signal based on cutoff frequency information d [S530].

The gain controlling part 510 is able to further generate saturation control information k based on at least one of output property information g and loudspeaker properties (sc). The saturation control information k can include information on properties of filters that can be included in the soft saturating part 533. In this case, the filter property can include a cutoff frequency. Meanwhile, in case that a high pass filter (HPF) and a low pass filter (LPF) are included in the soft saturating part 533, the saturation control information k can include a cutoff frequency $f_{c1}$ of the high pass filter and a cutoff frequency $f_{c2}$ of the low pass filter. The soft saturating part 533, in which the high pass filter (HPF) and the low pass filter (LPF) are included, shall be explained with reference to FIG. 12 later.

In particular, the cutoff frequency $f_{c1}$ of the high pass filter can be generated using the output property information g and can be also generated further using the loudspeaker properties (Sc). For instance, a combined signal Y generated from combining a saturated signal $X_{A1}$ generated by the soft saturating part 533 with a high frequency signal $X_2$ may be greater than a headroom corresponding to a maximum response of speaker. To prevent this, the cutoff frequency $f_{c1}$ of the high pass filter can be determined.

The cutoff frequency $f_{c2}$ of the low pass filter can be determined in a manner of interconnecting to the cutoff frequency $f_{c1}$ of the high pass filter. Preferably, the cutoff frequency $f_{c2}$ of the low pass filter is determined greater than the cutoff frequency $f_{c1}$ of the high pass filter.

$$f_{c2}>f_{c1} \quad \text{[Formula 5]}$$

In Formula 5, the $f_{c2}$ is a cutoff frequency of a low pass filter and the $f_{c1}$ is a cutoff frequency of a high pass filter.

Meanwhile, the soft saturating part 533 generates a saturated signal $X_{A1}$ in a manner of saturating the over-boosted signal $X_A$ and then shaping it according to a maximum response curve of loudspeaker, based on the saturating control information k [S540]. In this saturating process, a harmonic is generated as much as a signal, which is not reproduced by a speaker, according to the response property of a specific loudspeaker. Through a speaker response curve fitting process, linear boost can be performed up to a maximum available level.

Meanwhile, the saturated signal $X_{A1}$ may correspond to low frequency signal including the harmonic signal.

A detailed configuration of one example of the soft saturating part 533 is explained with reference to FIG. 12 as follows.

Referring to FIG. 12, the soft saturating part 533 can include a saturator 533.1, a high pass filter 533.2 and a low pass filter 533.3. Of course, the soft saturating part 533 can include another component instead of the detailed components.

The saturator 533.1 saturates the over-boosted signal $X_A$. The high pass filter 533.2 attenuates a signal on a band below the cutoff frequency $f_{c1}$ in the saturated signal using the cutoff frequency $f_{c1}$ of the high pass filter. The low pass filter 533.3 attenuates a signal below the cutoff frequency $f_{c2}$ in the result of the high pass filter 533.2 and then generates a final saturated signal $X_{A1}$ by passing the signal below the cutoff frequency $f_{c2}$.

Referring now to FIG. 11 and FIG. 13, the combining part 540 generates a combined signal Y by combining the saturate signal $X_{A1}$ generated from the soft saturating part 533 with the high frequency signal extracted by the high frequency signal extracting part 530 [S550]. Subsequently, the amplifying/outputting part 450 amplifies the combined signal Y according to a target level (ui) and then reproduces an output signal by outputting the amplified signal via such a device as a speaker and the like [S560].

Thus, according to the fifth embodiment of the present invention, soft saturation is performed on the signal generated from over-boosting the low frequency signal. through this process, bass is boosted by adjusting a gain linearly within a response property range of speaker and a harmonic is generated for a portion exceeding the limit of the response property range of the speaker. Therefore, the bass boost can be enhanced.

Figure 14:
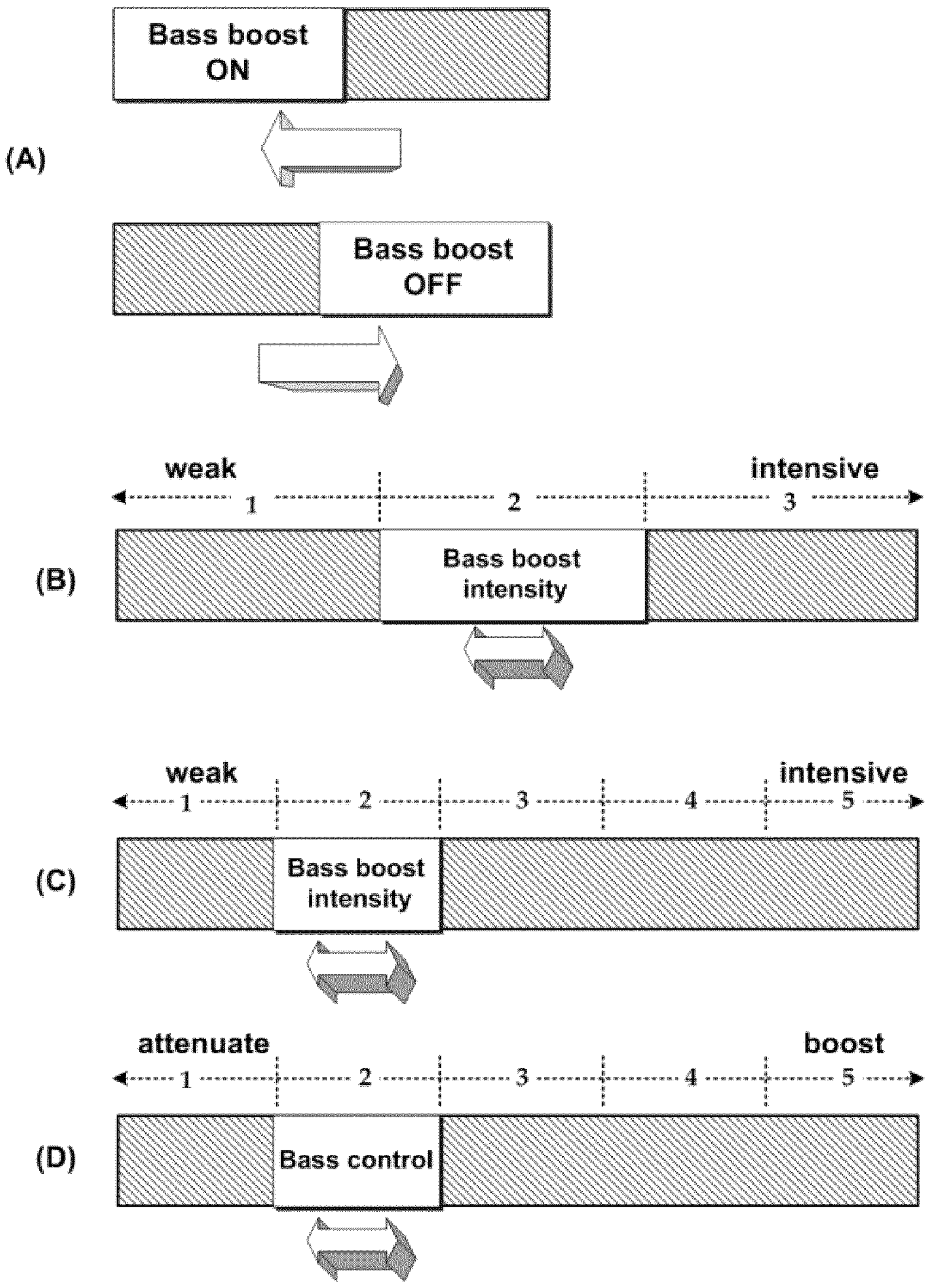
FIG. 14 is a diagram for examples of a user interface for inputting a bass control command.

FIG. 14 is a diagram for examples of a user interface for inputting a bass control command. In this case, the bass control command is the command for boosting (enhancing) or attenuating bass. In particular, the bass control command can include a command for whether to boost or attenuate the bass and a command for an extent of the boost (or attenuation) if the bass is boosted (or attenuated).

Referring to (A) of FIG. 14, provided is a button key for selecting whether to turn on or off a bass boost mode. This button key can be implemented with OSD (on screen display). A type or shape of the OSD is non-limited by the present invention. Referring to (B) of FIG. 14, provided is a graphic user interface for inputting intensity of bass boost. The bass boost intensity is adjustable by 3 steps between the weak and the intensive. By shifting a bar of 'bass boost intensity' to the left or right, it is able to select a specific one of the 3 steps. Referring to (C) of FIG. 14, the bass boost intensity is divided not into 3 steps but into 5 steps. Theses steps are non-limited by the present invention. Referring to (D) of FIG. 14, it can be observed that an interface for selecting 'bass attenuate' as well as 'bass boost' is provided.

Meanwhile, the bass control command inputted via one of the above interfaces is inputted to one of the gain controlling parts 110 to 510 of the first to fifth embodiments 100 to 500. The gain controlling part is able to use the bass control command in generating the low-band gain a, the harmonic control factor b, the normalizing gain t, the saturation control information k or the like.

For instance, if an intensive bass boost is selected according to the bass control command, both of the low-band gain (linear gain) a and the harmonic control factor b are usable. If a weak bass boost is selected by a user, the low-band gain (linear gain) a is usable. Although the weak bass boost is selected, if the bass over a frequency response (or a physical limit) of loudspeaker is outputted, both of the low-band gain a and the harmonic control factor b are usable.

Moreover, irrespective of the bass control command (i.e., irrespective of whether the intensive bass boost or the weak bass boost is selected), both of the low-band gain a and the harmonic control factor b are simultaneously usable. In this case, although the low-band gain a and the harmonic control factor b may be inverse proportional to each other, they can be proportional to each other over a predetermined range.

The audio signal processing apparatus according to the present invention is available for various products to use. Theses products can be mainly grouped into a stand alone group and a portable group. A TV, a monitor, a settop box and the like can be included in the stand alone group. And, a PMP, a mobile phone, a navigation system and the like can be included in the portable group.

Figure 15:
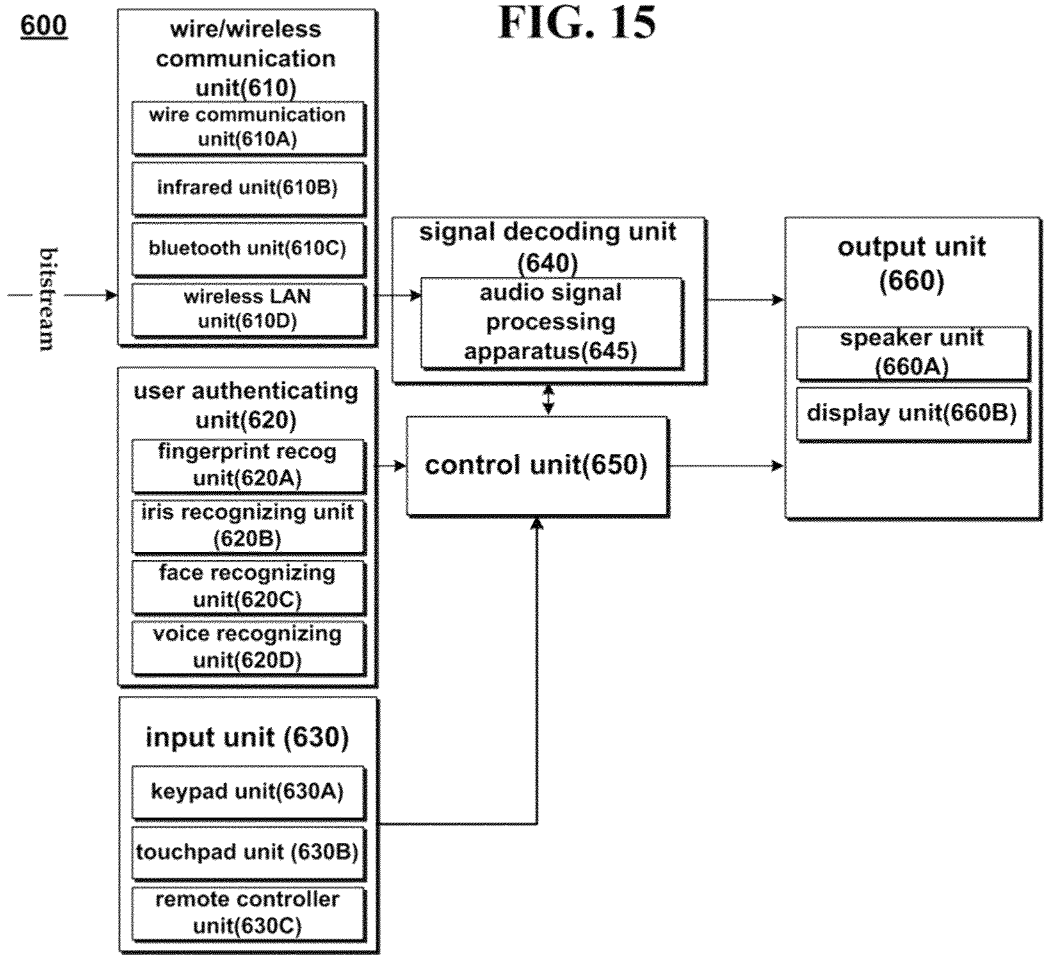
FIG. 15 is a schematic block diagram of a product in which an audio signal processing apparatus according to an embodiment of the present invention is implemented.
Figure 16:
FIG. 16 is a diagram for explaining relations between products in which an audio signal processing apparatus according to an embodiment of the present invention is implemented.
Figure 16:
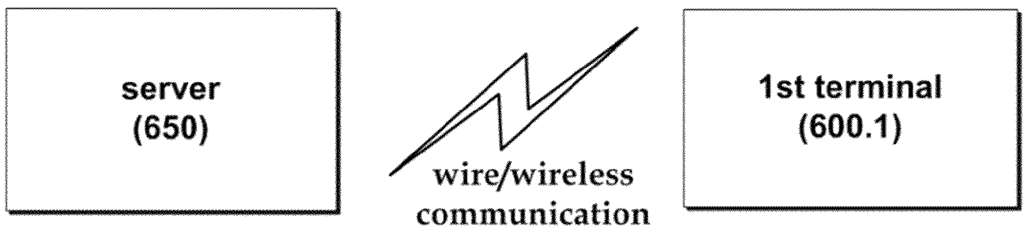

FIG. 15 is a schematic block diagram of a product in which an audio signal processing apparatus according to one embodiment of the present invention is implemented. And, FIG. 16 is a diagram for explaining relations between products in which an audio signal processing apparatus according to one embodiment of the present invention is implemented.

Referring to FIG. 15, a wire/wireless communication unit 610 receives a bitstream via wire/wireless communication system. In particular, the wire/wireless communication unit 610 can include at least one of a wire communication unit 610A, an infrared unit 610B, a Bluetooth unit 610C and a wireless LAN unit 610D.

A user authenticating unit 620 receives an input of user information and then performs user authentication. The user authenticating unit 620 can include at least one of a fingerprint recognizing unit 620A, an iris recognizing unit 620B, a face recognizing unit 620C and a voice recognizing unit 620D. The fingerprint recognizing unit 620A, the iris recognizing unit 620B, the face recognizing unit 620C and the speech recognizing unit 620D receive fingerprint information, iris information, face contour information and voice information and then convert them into user informations, respectively. Whether each of the user informations matches pre-registered user data is determined to perform the user authentication.

An input unit 630 is an input device enabling a user to input various kinds of commands and can include at least one of a keypad unit 630A, a touchpad unit 630B and a remote controller unit 630C, by which the present invention is non-limited.

A signal coding unit 640 performs encoding or decoding on an audio signal and/or a video signal, which is received via the wire/wireless communication unit 610, and then outputs an audio signal in time domain. The signal coding unit 640 includes an audio signal processing apparatus 645. As mentioned in the foregoing description, the audio signal processing apparatus 645 corresponds to the above-described embodiment. Before an audio signal is outputted via the output unit, the audio signal processing apparatus 645 performs at least one of noise canceling, normalizing, volume control and bass control on the audio signal. Thus, the audio signal processing apparatus 645 and the signal coding unit including the same can be implemented by at least one or more processors.

A control unit 650 receives input signals from input devices and controls all processes of the signal decoding unit 640 and an output unit 660. In particular, the output unit 660 is an element configured to output an output signal generated by the signal decoding unit 640 and the like and can include a speaker unit 660A and a display unit 660B. If the output signal is an audio signal, it is outputted to a speaker. If the output signal is a video signal, it is outputted via a display.

FIG. 16 is a diagram for the relation between a terminal and server corresponding to the products shown in FIG. 15.

Referring to (A) of FIG. 16, it can be observed that a first terminal 600.1 and a second terminal 600.2 can exchange data or bitstreams bi-directionally with each other via the wire/wireless communication units. Referring to (B) of FIG. 16, it can be observed that a server 650 and a first terminal 600.1 can perform wire/wireless communication with each other.

Figure 17:
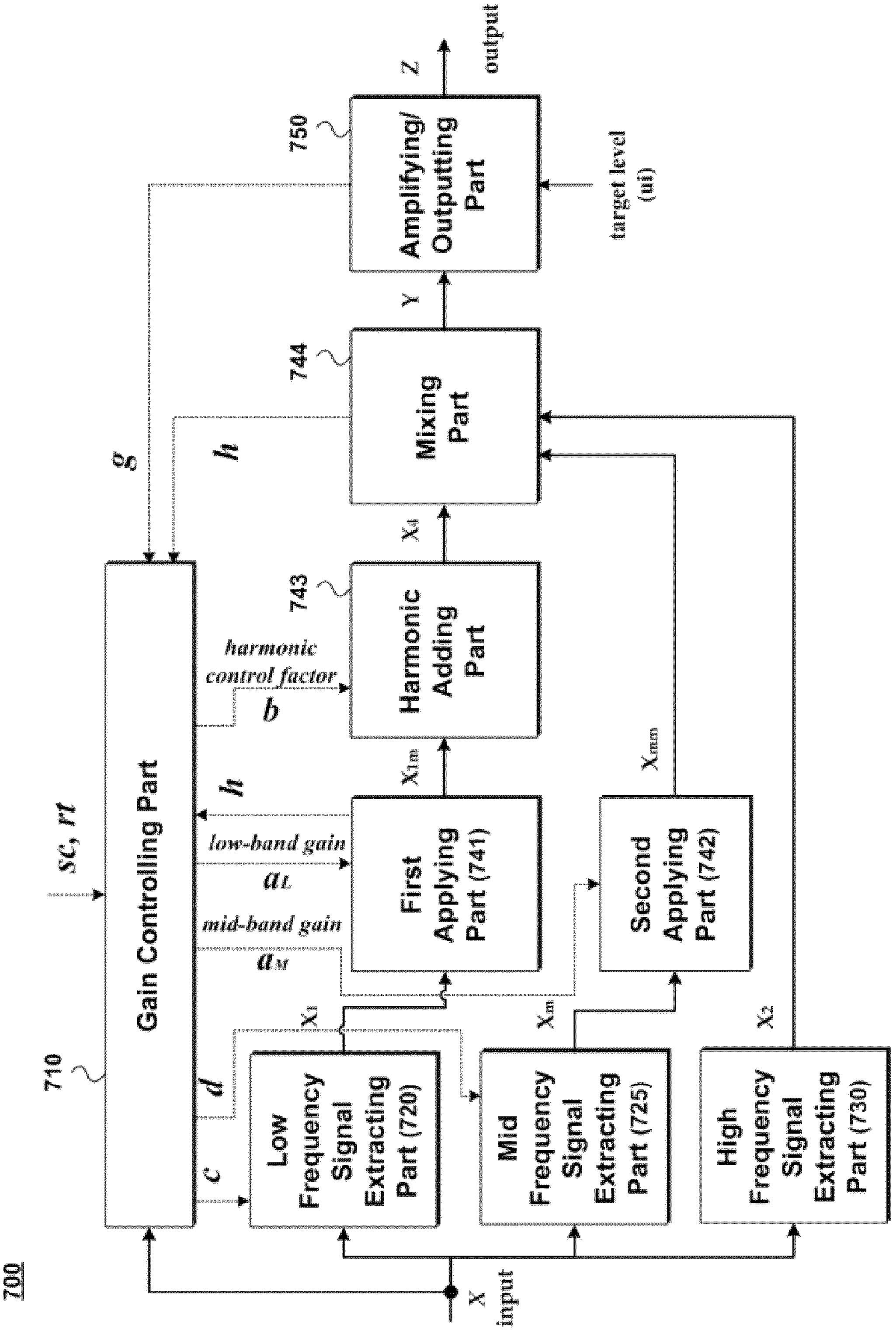
FIG. 17 is a block diagram of an audio signal processing apparatus according to a sixth embodiment of the present invention.
Figure 18:
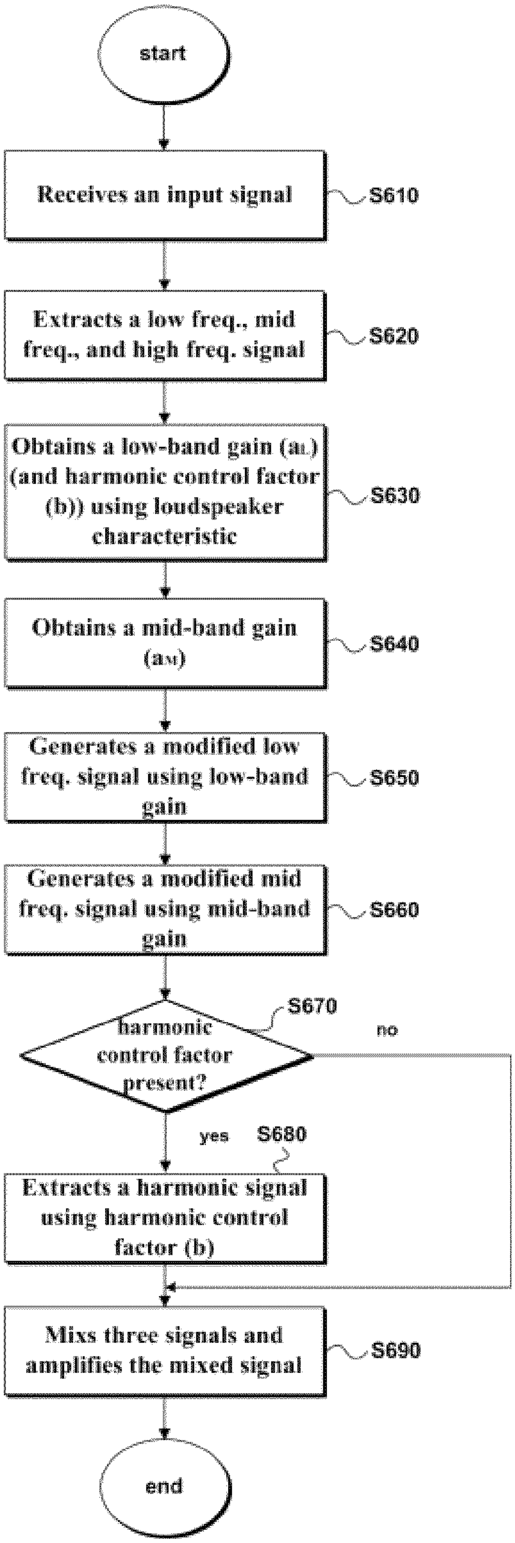
FIG. 18 is a flowchart for a method of processing an audio signal according to a sixth embodiment of the present invention.

FIG. 17 is a block diagram of an audio signal processing apparatus according to a sixth embodiment of the present invention, and FIG. 18 is a flowchart for a method of processing an audio signal according to a sixth embodiment of the present invention.

Referring to FIG. 17, an audio signal processing apparatus 700 according to a second embodiment of the present invention includes a gain controlling part 710, a low frequency signal extracting part 720, a mid frequency signal extracting part 725, a high frequency signal extracting part 730, a first applying part 741, a second applying part 742, a harmonic adding part 743 and a mixing part 744. Besides, the audio signal processing apparatus 700 can further include an amplifying/outputting part 750.

Referring to FIG. 17 and FIG. 18, a receiving part (not shown in the drawing) receives an input signal [S610]. The low frequency signal extracting part 720 extracts a low frequency signal $X_1$ from the input signal, the mid frequency signal extracting part 725 extracts a mid frequency signal $X_m$ from the input signal X, and the high frequency signal extracting part 730 extracts a high frequency signal $X_2$ from the input signal X [S620].

Meanwhile, like the first or second embodiment, the gain controlling part 710M generates a low-band gain $a_L$, using the loudspeaker characteristics (sc) or generates a low-band gain $a_L$ and a harmonic control factor b [S630]. A value of the harmonic control factor b is interoperable with a value of the low-band gain a. This interoperable relation can be implemented in various ways. First of all, as mentioned in the foregoing description of the second embodiment, the harmonic control factor b is inverse proportional to the low-band gain $a_L$ or can be negative-related to the low-band gain aL.

And, a sum of the harmonic control factor b and the low-band gain $a_L$ can be almost set to a constant (or a fixed value). Moreover, if the low-band gain $a_L$ does not exceed a specific threshold value, the harmonic control factor b is not generated. If the low-band gain exceeds a specific threshold value, a value of the harmonic control factor b can be determined based on a difference between a specific bass enhancement level and the threshold value.

Thus, the above two factors have the interoperable relation due to the following reasons. First of all, since the low-band gain $a_L$ is a linear gain, as mentioned in the foregoing description with reference to FIG. 3 or FIG. 6, limitation is put on amplifying the bass according to a size of an input signal. If the low-band gain $a_L$ exceeds a specific threshold value, if the harmonic control factor b is generated, it is able to generate a harmonic to boost the bass over the threshold of the linear gain. IN particular, if it is sufficient to control the bass using the low-band gain $a_L$ (e.g., if the low-band gain lies within the threshold value), the low-band gain $a_L$ is generated only but the harmonic control factor b is not generated. Therefore, it is able to deactivate the low frequency signal extracting part 720.

Meanwhile, as mentioned in the foregoing description of the second embodiment, the low-band gain $a_L$ and the harmonic control factor b can be generated based on the room properties (rt), output property information g and properties h of the mix signal Y.

The gain controlling part 710 generates a mid-band gain $a_M$ based on the loudspeaker characteristics (sc) [S640]. Likewise, the mid-band gain $a_M$ can further refer to the room properties (rt), output property information g and properties h of the mix signal Y.

The first applying part 741 generates a modified low frequency signal $X_{1m}$ by applying the low-band gain $a_L$ to the low frequency signal $X_1$, [S650].

The second applying part 742 generates a modified mid frequency signal $X_{mm}$ by applying the mid-band gain $a_M$ to the mid frequency signal Xm, [S660].

In case that the harmonic control factor b is generated by the gain controlling part 710 ['yes' in the step S670], a harmonic adding part 743 generates a harmonic signal from the modified low frequency signal $X_{1m}$ and a modified low frequency signal $X_4$ including the harmonic signal by adding the harmonic signal to the modified low frequency signal [S680]. The harmonic signal can be generated based on over-boosting and saturation described with reference to FIG. 11 and FIG. 12.

The mixing part 744 generates a mix signal Y or a processed signal Y by mixing the modified low frequency signal $X_4$ including the harmonic signal, the modified mid frequency signal $X_{mm}$ and the high frequency signal $X_2$ together [S690]. Meanwhile, if the harmonic adding part 743 is deactivated, a mixing part 744 generates a mix signal Y by mixing the modified low frequency signal $X_{1m}$, in which the harmonic signal is not included, the modified mid frequency signal $X_{mm}$ and the high frequency signal $X_2$ together. Subsequently, the amplifying/outputting part 750 amplifies the mix signal Y according to a target level (ui) and then outputs an output signal via such a device as a speaker and the like.

An audio signal processing method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

Accordingly, the present invention is applicable to processing and outputting of audio signals.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Accordingly, the present invention provides the following effects or advantages.

First of all, if a size of a signal is small, a bass control is performed by a linear gain. If a size of a signal is big, a bass control by a harmonic signal can be supplementarily performed on a portion having limitation put on a bass control by a linear gain.

Secondly, since bass enhancement by a harmonic signal is supplementarily enabled, the present invention is able to enhance bass in a region having limitation put on a bass control by a linear gain.

Thirdly, the present invention performs a bass control in consideration of a size of a signal as well as speaker response properties, the present invention is able to adaptively enhance bass according to properties of an input signal.

Fourthly, a bass control by a linear gain and a bass control by a harmonic signal are applied automatically and simultaneously through over-boost and saturation.

Fifthly, since bass can be adaptively enhanced according to a physical limit of a speaker and properties of an input signal, the present invention is able to considerably reduce signal distortion that may be generated from the enhancement of the bass.

Sixthly, for a low band both linear gain control and non-linear gain control are performed, for a mid band linear gain control is performed, therefore it is able to sensitively control bass per band.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing an audio signal, comprising:

receiving, by an audio processing apparatus, an input signal;

extracting, via a low frequency extracting part, a mid frequency extracting part, and a high frequency extracting part, respectively, a low frequency signal, a mid frequency signal and a high frequency signal from the input signal;

obtaining, via a gain control part, a low-band gain, a mid-band gain, and a harmonic control factor, based on a loudspeaker characteristic;

inputting, to a first applying part, the low frequency signal extracted from the low frequency extracting part, and the low-band gain obtained from the gain controlling part, and generating, via the first applying part, a modified low frequency signal by applying the inputted low-band gain to the inputted low frequency signal;

inputting, to a harmonic extracting part, the modified low frequency signal generated by the first applying part;

when the harmonic control factor is obtained, inputting, to the harmonic extracting part, the harmonic control factor obtained from the gain control part, and generating, via the harmonic extracting part, a harmonic signal from the inputted modified low frequency signal using the inputted harmonic control factor, inputting, to a second applying part, the mid frequency signal extracted from the mid frequency extracted part, and the mid-band gain obtained from the gain control part, and generating, via the second applying part, a modified mid frequency signal by applying the inputted mid-band gain to the inputted mid frequency signal; and inputting, to a mixing part, the modified mid frequency signal generated by the second applying part, the high frequency signal extracted from the high frequency extracting part, and the harmonic signal generated by the harmonic extractin art and generating, via the mixing part, a mixed signal by mixing the inputted modified mid frequency signal, the inputted high frequency signal, and the inputted harmonic signal.

2. The method of claim 1, wherein the loudspeaker characteristic includes a frequency response for each frequency in a specific loudspeaker.

3. The method of claim 1, further comprising:

reproducing an output signal by amplifying the mixed signal with a target level, wherein the low-band gain is obtained further based on a characteristic of the output signal, a characteristic of the mixed signal and room properties.

4. The method of claim 1, wherein the harmonic control factor is obtained, when the low-band gain is equal to or greater than a threshold value.

5. The method of claim 1, wherein the low-band gain is negative-related to the harmonic control factor.

6. The method of claim 1, further comprising:

receiving a bass control command selecting whether to boost the low frequency signal, from a user-interface, wherein the low-band gain, the mid-band gain and the harmonic control factor are obtained according to the bass control command

7. The method of claim 1, wherein the low frequency signal, the mid frequency signal and the high frequency signal are extracted based on the loudspeaker characteristic.

8. An apparatus for processing an audio signal, comprising:

a receiving part receiving an input signal;

a frequency signal extracting part including a low frequency extracting part, a mid frequency extracting part, and a high frequency extracting part configured to extract, respectively, a low frequency signal, a mid frequency signal and a high frequency signal from the input signal;

a gain controlling part configured to obtain a low-band gain, a mid-band gain, and a harmonic control factor, based on a loudspeaker characteristic;

a first applying part configured to input the low frequency signal extracted from the low frequency extracting part, and the low-band gain obtained from the gain controlling part, and generate a modified low frequency signal by applying the inputted low-band gain to the inputted low frequency signal;

a harmonic extracting part, when the harmonic control factor is obtained, configured to input the modified low frequency signal generated by the first applying part, and the harmonic control factor obtained from the gain control part, and generate a harmonic signal from the inputted modified low frequency signal;

a second applying part configured to input the mid frequency signal extracted from the mid frequency extracted part, and the mid-band gain obtained from the gain control part, and generate a modified mid frequency signal by applying the inputted mid-band gain to the inputted mid frequency signal; and a mixing part configured to input the modified mid frequency signal generated by the second applying part, the high frequency signal extracted from the high frequency extracting part, and the harmonic signal generated by the harmonic extracting part, and generate a mixed signal by mixing the inputted modified mid frequency signal, the inputted high frequency signal, and the inputted harmonic signal.

9. The apparatus of claim 8, wherein the loudspeaker characteristic includes a frequency response for each frequency in a specific loudspeaker.

10. The apparatus of claim 8, further comprising:

an amplifying/outputting part reproducing an output signal by amplifying the mixed signal with a target level, wherein the low-band gain is obtained further based on at least one of a characteristic of the output signal, a characteristic of the mixed signal and room properties.

11. The apparatus of claim 8, wherein the harmonic control factor is obtained, when the low-band gain is equal to or greater than a threshold value.

12. The apparatus of claim 8, wherein the low-band gain is negative-related to the harmonic control factor.

13. The apparatus of claim 8, further comprising:

a user-interface receiving a bass control command selecting whether to boost the low frequency signal, wherein the low-band gain, the mid-band gain and the harmonic control factor are obtained according to the bass control command.

14. The apparatus of claim 8, wherein the low frequency signal, the mid frequency signal and the high frequency signal are extracted based on the loudspeaker characteristic.

15. A non-transitory computer-readable medium having instructions stored thereon, which, when executed by a processor, causes the processor to perform operations, comprising:

receiving, by an audio processing apparatus, an input signal;

extracting, via a low frequency extracting part, a mid frequency extracting part, and a high frequency extracting part, respectively, a low frequency signal, a mid frequency signal and a high frequency signal from the input signal;

obtaining, via a gain control part, a low-band gain, a mid-band gain, and a harmonic control factor, based on a loudspeaker characteristic;

inputting, to a first applying part, the low frequency signal extracted from the low frequency extracting part, and the low-band gain obtained from the gain controlling part, and generating, via the first applying part, a modified low frequency signal by applying the inputted low-band gain to the inputted low frequency signal;

inputting, to a harmonic extracting part, the modified low frequency signal generated by the first applying part;

when the harmonic control factor is obtained, inputting, to the harmonic extracting part, the harmonic control factor obtained from the gain control part, and generating, via the harmonic extracting part, a harmonic signal from the inputted modified low frequency signal using the inputted harmonic control factor, inputting, to a second applying part, the mid frequency signal extracted from the mid frequency extracted part, and the mid-band gain obtained from the gain control part, and generating, via the second applying part, a modified mid frequency signal by applying the inputted mid-band gain to the inputted mid frequency signal; and inputting, to a mixing part, the modified mid frequency signal generated by the second applying part, the high frequency signal extracted from the high frequency extracting part, and the harmonic signal generated by the harmonic extracting part, and generating, via the mixing part, a mixed signal by mixing the inputted modified mid frequency signal, the inputted high frequency signal, and the inputted harmonic signal.

16. The method of claim 1, wherein the harmonic control factor is information for controlling a band and size of the harmonic signal.

* * * * *